April 18, 1967  J. J. ECKL  3,315,098
FIRING CIRCUIT FOR A CONTROLLED RECTIFIER
Filed June 22, 1964
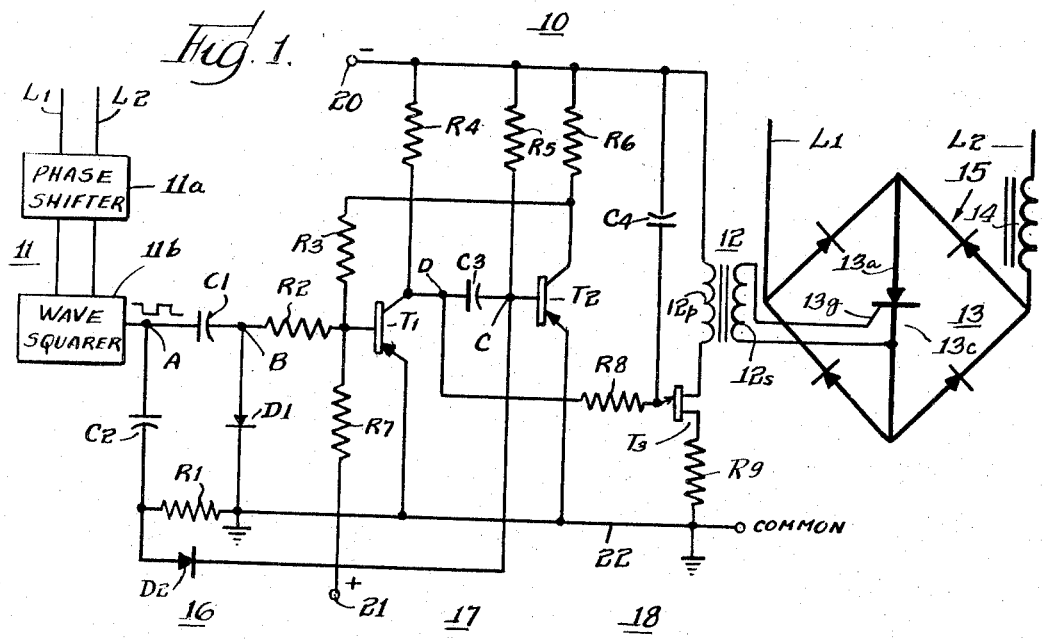
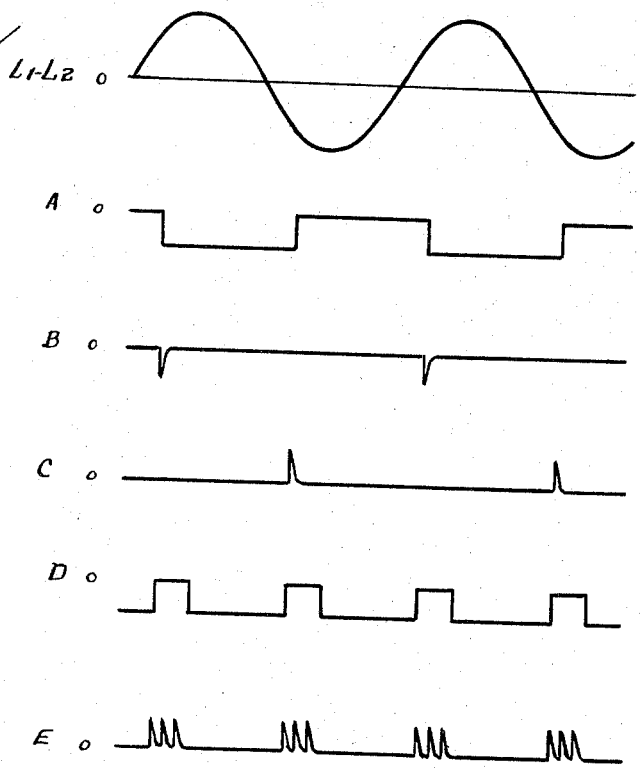
Inventor
James J. Eckl 3,315,098
FIRING CIRCUIT FOR A CONTROLLED RECTIFIER
James J. Eckl, Milwaukee, Wis., assignor to Square D Company, Park Ridge, Ill., a corporation of Michigan
Filed June 22, 1964, Ser. No. 376,724
2 Claims. (Cl. 307—88.5)

This invention relates to a firing circuit for a semiconductor controlled rectifier or the like, and more particularly to a rectifier firing circuit which supplies adjustably phase-positioned trains of discrete firing pulses across the gate and cathode electrodes of the rectifier.

When a controlled rectifier is to conduct during each successive half cycle of an alternating voltage, it is often desirable to cause conduction to begin precisely at any preselected point throughout the full 180 degrees of the voltage wave of each half cycle. Such accurate and wide-range control of the firing angle is desirable, for example, in resistance welding and other heating applications. It has been found that in such applications, particularly when full cycle or substantially full cycle conduction is desired and the load, e.g. a resistance welder, is inductive, a silicon controlled rectifier occasionally fails to fire upon the application of only a single firing pulse. Hence, to insure firing of the controlled rectifier during each cycle, it is desirable that the firing signal for each half cycle be in the form of a series or a train of rapidly repeated pulses. The rectifier firing circuit of this invention responds to periodic changes in voltage level at a phase-shiftable input device to provide, at a rectifier to be controlled, the desired rapidly repeated pulses at any preselected point on the voltage wave for each half cycle of the voltage impressed on the rectifier.

It is an object of this invention to provide an improved firing circuit for a controlled rectifier.

Another object is to provide an improved firing circuit particularly suitable for the control of a silicon controlled rectifier and operative to provide an output in the form of trains of discrete voltage pulses.

A further object is to provide a rectifier firing circuit comprising a multivibrator controlling the operation of a relaxation oscillator.

Another object is to provide a rectifier firing circuit responsive to an input voltage adjustably phase-positioned relative to an alternating voltage to supply spaced trains of voltage pulses, the first pulse of each train of pulses being in a predetermined phase position with respect to the alternating voltage.

Further objects and advantages of this invention will become apparent from the following specification wherein reference is made to the drawings, in which:

FIG. 1 is an elementary wiring diagram of a rectifier firing circuit in accordance with this invention, and FIG. 2 is a series of graphs labeled A through E showing wave shapes present in the firing circuit of FIG. 1.

A rectifier firing circuit 10 in accordance with this invention is shown in FIG. 1 connected to receive an input signal from an input device 11 comprising a phase shifter section 11a and wave squarer section 11b and having an output device, such as a transformer 12, controlling a silicon controlled rectifier 13 connected across a diode bridge 15 fed from a source of alternating voltage, indicated by a pair of supply lines L1 and L2, with an inductive load 14 connected in series with one of the supply lines, such as L2. The supply lines L1 and L2 also supply the input device 11. The transformer 12 has a primary winding 12p and a secondary winding 12s, and the rectifier 13 has an anode 13a, a cathode 13c, and a gate or control electrode 13g.

The input device 11 may be one of several well known types operative to supply a voltage signal at an input junction A in the form of a square wave as shown by the graph A of FIG. 2 and displaceable in phase from the voltage of the source L1–L2 by various adjustable amounts such as an angle of X degrees indicated in FIG. 2 wherein the phase position of the voltage of the source L1 and L2 is shown for reference. The graphs A, B, C, and D of FIG. 2 show the wave shapes of the voltage signals at the like-lettered junctions A, B, C, and D of FIG. 1, respectively. The firing circuit 10 responds to the input voltage signal at the junction A to provide spaced trains of firing pulses across the gate 13g and cathode 13c of the rectifier 13 as illustrated by the graph E of FIG. 2.

The firing circuit 10 comprises a positive and negative pulse forming section 16, a one-shot multivibrator section 17, and a relaxation oscillator section 18. The pulse forming section 16 comprises a pair of capacitors C1 and C2, a pair of diodes D1 and D2, and a pair of resistors R1 and R2. The multivibrator section 17 comprises a capacitor C3, a plurality of resistors R3 through R7, and a pair of transistors T1 and T2. The oscillator section 18 comprises a capacitor C4, a unijunction transistor T3, a pair of resistors R8 and R9, and the transformer 12.

One terminal of the capacitor C1 is connected to the input device 11 through the junction A and the other terminal of the capacitor C1 is connected to one terminal of the resistor R2 through the junction B. The capacitor C2 is connected between the input device 11 and the junction C through the diode D2 which is poled to pass positive pulses to the junction C. The resistor R1 is connected between ground and the junction of the diode D2 and the capacitor C1. One terminal of the capacitor C3 is connected through the junction C to the base of the transistor T2 and the other terminal of the capacitor C3 is connected to the collector of the transistor T1 through the junction D. Other interconnections of the components of the circuit 10 will become apparent as the description proceeds.

The circuit 10 is supplied with a negative operating voltage of suitable magnitude from a source terminal 20 and with a positive operating voltage of suitable magnitude from a source terminal 21. The resistors R4 and R6 are collector load resistors for the transistors T1 and T2, respectively. A grounded conductor 22 serves as a common or zero potential source terminal.

When the multivibrator section 17 is in its normal state, the transistor T2 is conductive and the transistor T1 is non-conductive because of the positive bias applied thereto through the resistor R7.

The pulse forming section 16 includes a first means to provide a negative triggering pulse for the multivibrator section 17 when the signal at the junction A changes from a zero value to a negative value and a second means for providing a similar but positive triggering pulse when the signal at the junction A changes from a negative value to zero. The first means comprises the circuit including the capacitor C1 and the resistor R2. The second means comprises the circuit including the capacitor C2 and the diode D2. Although the voltage signal at the junction A is shown as a square wave alternating between zero and a negative value, it will be understood that, depending upon the biasing conditions at the transistors T1 and T2, a signal varying periodically between other voltage values could be used.

When the voltage signal at the junction A changes from zero to a negative value, the capacitor C1 charges quickly and supplies a negative voltage pulse at the junction B. Concurrently, the capacitor C2 charges through the resistor R1, but has no immediate effect at this time. The negative voltage pulse at the junction B is impressed on the base of the transistor T1. Conduction of the transistor T1 brings its collector and thereby the junction D to the reference or ground potential so that the charge present on the capacitor C3 is discharged through the resistor R5 resulting in a positive voltage at the junction C. The positive voltage at the junction C renders the transistor T2 non-conductive and the collector thereof thereupon changes to a negative value. Since the collector of the transistor T2 is connected to the base of the transistor T1 through the resistor R3, the base of transistor T1 remains negative for the discharge time of the capacitor C3 to maintain the transistor T1 conductive. Thus, even though the pulse at the junction B is of very short duration, the capacitor C3, because of its relatively long discharge time, maintains the transistor T2 non-conducting and the transistor T1 conducting for a substantial portion of a cycle. The voltage at the junction D thus remains at zero for the time interval indicated by the graph D of FIG. 2.

Upon the voltage at the junction D becoming zero, the capacitor C4 starts to charge through the resistor R8. When the voltage across the capacitor C4 reaches the firing potential of the unijunction transistor T3, the transistor T3 fires to effect discharge of the capacitor C4 and to permit a voltage pulse to appear at the primary winding 12p. Suitable temperature compensation is provided for the circuit 18 by the resistor R9. By action of the transformer 12, the pulse at the primary winding 12p is applied through the secondary winding 12s across the cathode 13c and the gate 13g of the rectifier 13. The time constant of the RC circuit including the resistor R8 and the capacitor C4 is such that the capacitor C4 is rapidly and repeatedly charged and discharged to effect a series of pulses in the primary winding 12p during the interval that the junction D remains at zero potential. As shown by the graph E of FIG. 2, three such pulses are preferably provided.

When the charge on the capacitor C3 is substantially dissipated, the transistor T2 again becomes conducting causing the transistor T1 to become non-conducting and permitting the capacitor C3 to recharge. The voltage at the junction D again becomes negative and operation of the oscillator section 18 ceases.

As mentioned, the multivibrator section 17 will also trigger on a change in the voltage at the junction A in a positive direction, i.e. from a negative value to zero. This occurs because, upon such a change in the voltage at the junction A, the capacitor C2, previously charged through the resistor R1, now discharges through the diode D2 and impresses a positive pulse at the junction C. This pulse is indicated by the graph C of FIG. 2. The diode D1 functions to prevent the positive pulse from reaching the base of the transistor T1. Thus the circuit comprising the capacitor C2 and the diode D2 is a means for transferring a change in the signal voltage at the junction A in a positive direction to a positive pulse at the junction C. This positive pulse causes the transistor T2 to become non-conductive and the transistor T1 to become conductive in the manner previously described. The capacitor C3 then starts to discharge through the resistor R5 and the oscillator section 18 is rendered operative to provide a second series of pulses also indicated by the graph E of FIG. 2.

Each time a series of the pulses of the graph E are impressed across the cathode 13c and the gate 13g of the rectifier 13, the rectifier 13 fires to conduct current to the load 14. Ordinarily the rectifier 13 conducts upon impression of the first of the three pulses, but if it fails to do so, the second or third pulse effects firing.

It should be noted that four time constants are effective in the firing circuit 10. One is charging time of the capacitor C1, and a second is the discharge time of the capacitor C2. Both of these intervals are relatively short and need be only long enough to start the action of the multivibrator section 17. The third time constant is the discharge time of the capacitor C3. This time constant is relatively long, preferably about 20 degrees, although it is shown longer in FIG. 2 for clarity of illustration. The fourth time constant is determined by the capacitor C4 and the resistor R8 and is preferably selected so that at least three pulses appear at the gate-cathode circuit of the rectifier 13 during the discharge time of the capacitor C3.

The train of pulses indicated by the graph E of FIG. 2 has a number of desirable features as a firing voltage signal for a silicon controlled rectifier. The use of trains of pulses perfectly balanced 180 degrees apart results in the reliable firing of the controlled rectifier 13 over a wide range of ambient temperature conditions. A train of pulses has the advantage over a single pulse in that if the rectifier fails to fire as a result of the first pulse, the second or third pulse causes firing within such a short time that little difference in the current output results. Thus, the train of pulses insures proper firing for substantially full half-wave conduction even though there is a slight misadjustment of the angle of the first pulse with respect to the zero point of the wave. This feature is of significant benefit in welding applications where a change in circuit parameters, particularly with respect to the load characteristics, may shift the power factor such that the first of the applied firing pulses may precede the zero node of the succeeding half cycle. The repeated pulses in the train however insure the firing of the controlled rectifier as soon as sufficient potential is impressed across it.

Another important feature of the invention is the conversion from a wave shape such as shown in graph A of FIG. 2 to the wave shape shown in graph E of FIG. 2 with a perfect 180 degree displacement between the beginning of each train of pulses. This results because both the increase and decrease of the signal at the junction A triggers the multivibrator section 17 with a very short delay and because the capacitor C4 discharges at substantially the same voltage level. Further, the delay in firing the oscillator section 18 is substantially the same for both changes in polarity at the junction A because the same circuit responds to both. This balanced 180 degree displacement of the firing pulse trains is highly desirable in welding operations to insure that firing take place at substantially the same point in succeeding half cycles thereby preventing transformer saturation.

I claim:

1. A controlled rectifier means and a firing circuit therefor comprising a controlled rectifier means having gate terminal means and connected between a source of alternating voltage of relatively low frequency and a load, a source of periodic voltage of square-wave form and of the same frequency and adjustably phase-positioned with respect to said source of alternating voltage, a one-shot multivibrator having a pair of inputs, a pulse former responsive to said periodic voltage to produce pulses of alternate polarity and of the same frequency as said source, means impressing said pulses of one polarity on one of said inputs of said multivibrator and said pulses of the opposite polarity on the other of said inputs of said multivibrator, said multivibrator including means to provide a unidirectional pulse upon reception of each input pulse, said unidirectional pulses being of longer duration than said input pulses but of shorter duration than one-half cycle of said source of alternating voltage, an oscillator responsive to said unidirectional pulses to provide, only during each unidirectional pulse, a train of a predetermined number of pulses of relatively high frequency each capable of firing said controlled rectifier means, and means for impressing each pulse of said train of pulses at said gate terminal means of said controlled rectifier means.

2. A controlled rectifier means and firing circuit therefor as in claim 1 characterized in that each of said high frequency pulses are of substantially the same magnitude.

(References on following page)

References Cited by the Examiner

UNITED STATES PATENTS

| | | | |
|---|---|---|---|
| 2,157,925 | 5/1939 | Stoddard | 315—251 X |
| 2,263,307 | 11/1941 | Lord | 315—251 X |
| 2,940,049 | 6/1960 | Guarrera | 328—210 |
| 3,047,789 | 7/1962 | Lowry | 331—111 X |
| 3,049,642 | 8/1962 | Quinn. | |
| 3,128,422 | 4/1964 | Brown | 315—194 X |
| 3,165,739 | 1/1965 | Long et al. | |
| 3,243,689 | 3/1965 | Perrins | 331—173 |
| 3,243,711 | 3/1966 | King et al. | 307—88.5 |

ARTHUR GAUSS, *Primary Examiner.*

JOHN W. HUCKERT, *Examiner.*

I. C. EDELL, R. H. EPSTEIN, *Assistant Examiners.*